United States Patent
Kim et al.

(10) Patent No.: US 7,417,946 B2
(45) Date of Patent: Aug. 26, 2008

(54) OFDM TRANSMISSION APPARATUS AND METHOD HAVING MINIMAL TRANSMISSION DELAY

(75) Inventors: Jung Hak Kim, Chunlabook-do (KR); Jae Ho Lee, Daejeon (KR); Jung Sik Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 659 days.

(21) Appl. No.: 11/115,585

(22) Filed: Apr. 26, 2005

(65) Prior Publication Data

US 2006/0092825 A1    May 4, 2006

(30) Foreign Application Priority Data

Oct. 28, 2004    (KR) ............... 10-2004-0086741

(51) Int. Cl.
*H04J 11/00* (2006.01)
*H04J 1/16* (2006.01)

(52) U.S. Cl. ................... 370/208; 370/252
(58) Field of Classification Search .............. None
See application file for complete search history.

(56) References Cited

U.S. PATENT DOCUMENTS

| | | | |
|---|---|---|---|
| 6,882,217 B1 * | 4/2005 | Mueller | 330/2 |
| 6,909,723 B1 * | 6/2005 | Yonge et al. | 370/447 |
| 6,985,537 B1 * | 1/2006 | Milbar | 370/344 |
| 6,987,770 B1 * | 1/2006 | Yonge, III | 370/401 |
| 7,274,750 B1 * | 9/2007 | Mueller | 375/297 |
| 7,352,770 B1 * | 4/2008 | Yonge et al. | 370/445 |
| 2004/0160892 A1 | 8/2004 | Agrawalla et al. | |
| 2005/0180311 A1 * | 8/2005 | Wang et al. | 370/208 |

FOREIGN PATENT DOCUMENTS

KR    1020020049790    6/2002

* cited by examiner

*Primary Examiner*—Andrew Lee
(74) *Attorney, Agent, or Firm*—Blakely, Sokoloff, Taylor & Zafman

(57) ABSTRACT

An OFDM transmission apparatus having minimal transmission delay comprises a training symbol storage and generation unit, a delay unit and a controller. The training symbol storage and generation unit stores training symbols for the preamble, and outputs the stored training symbols when a training symbol output request signal is received. The delay unit receives data for the signal field from the MAC layer, delays the received data by the data processing time of the scrambler, and outputs the delayed data to the convolution encoder. The controller outputs the training symbol output request signal, requesting the preamble of the frame, to the training symbol storage and generation unit when a frame transmission request is received from the MAC layer, and outputs a data request signal, requesting the signal field and the data field, to the MAC layer in consideration of total data processing time ($T_{PROCESS}$).

13 Claims, 15 Drawing Sheets

| Data Rate, Mbps | Constellation Mapping | Coding Rate, R | Number of coded bits per OFDM symbol($N_{CBPS}$) | Number of data bits per OFDM symbol ($N_{DBPS}$) | Active interval in which data field is ready to be transmitted ($T_{DBPS}$, BT = Bit Time) |
|---|---|---|---|---|---|
| 6 | BPSK | 1/2 | 48 | 24 | 24 BT |
| 9 | BPSK | 3/4 | 48 | 36 | 36 BT |
| 12 | QPSK | 1/2 | 96 | 48 | 48 BT |
| 18 | QPSK | 3/4 | 96 | 72 | 72 BT |
| 24 | 16-QAM | 1/2 | 192 | 96 | 96 BT |
| 36 | 16-QAM | 3/4 | 192 | 144 | 144 BT |
| 48 | 64-QAM | 2/3 | 288 | 192 | 192 BT |
| 54 | 64-QAM | 3/4 | 288 | 216 | 216 BT |

Constellation Mapping: BPSK

| Input bit | | Output |
|---|---|---|
| $n_0$ | | Inphase |
| 0 | x | -1 |
| 1 | x | 1 |

Constellation Mapping: QPSK

| Input bit | | Output |
|---|---|---|
| $n_0$ | | Inphase |
| 0 | x | $-1/\text{sqrt}(2)$ |
| 1 | x | $1/\text{sqrt}(2)$ |

Constellation Mapping: 16-QAM

| Input bit | | Output |
|---|---|---|
| $n_0$ | $n_1$ | Inphase |
| 0 | 0 | $-3/\text{sqrt}(10)$ |
| 0 | 1 | $-1/\text{sqrt}(10)$ |
| 1 | 1 | $1/\text{sqrt}(10)$ |
| 1 | 0 | $3/\text{sqrt}(10)$ |

Constellation Mapping: 64-QAM

| Input bit | | | Output |
|---|---|---|---|
| $n_0$ | $n_1$ | $n_2$ | Inphase |
| 0 | 0 | 0 | $-7/\text{sqrt}(42)$ |
| 0 | 0 | 1 | $-5/\text{sqrt}(42)$ |
| 0 | 1 | 1 | $-3/\text{sqrt}(42)$ |
| 0 | 1 | 0 | $-1/\text{sqrt}(42)$ |
| 1 | 1 | 0 | $1/\text{sqrt}(42)$ |
| 1 | 1 | 1 | $3/\text{sqrt}(42)$ |
| 1 | 0 | 1 | $5/\text{sqrt}(42)$ |
| 1 | 0 | 0 | $7/\text{sqrt}(42)$ | sprt(): square root function

Constellation Mapping: BPSK

| Input bit | | Output |
|---|---|---|
| | | Quadrature |
| x | x | 0 |
| x | x | 0 |

Constellation Mapping: QPSK

| Input bit | | Output |
|---|---|---|
| $n_1$ | | Quadrature |
| 0 | x | $-1/\text{sqrt}(2)$ |
| 1 | x | $1/\text{sqrt}(2)$ |

Constellation Mapping: 16-QAM

| Input bit | | Output |
|---|---|---|
| $n_2$ | $n_3$ | Quadrature |
| 0 | 0 | $-3/\text{sqrt}(10)$ |
| 0 | 1 | $-1/\text{sqrt}(10)$ |
| 1 | 1 | $1/\text{sqrt}(10)$ |
| 1 | 0 | $3/\text{sqrt}(10)$ |

Constellation Mapping: 64-QAM

| Input bit | | | Output |
|---|---|---|---|
| $n_3$ | $n_4$ | $n_5$ | Quadrature |
| 0 | 0 | 0 | $-7/\text{sqrt}(42)$ |
| 0 | 0 | 1 | $-5/\text{sqrt}(42)$ |
| 0 | 1 | 1 | $-3/\text{sqrt}(42)$ |
| 0 | 1 | 0 | $-1/\text{sqrt}(42)$ |
| 1 | 1 | 0 | $1/\text{sqrt}(42)$ |
| 1 | 1 | 1 | $3/\text{sqrt}(42)$ |
| 1 | 0 | 1 | $5/\text{sqrt}(42)$ |
| 1 | 0 | 0 | $7/\text{sqrt}(42)$ |

FIG. 12

OFDM TRANSMISSION APPARATUS AND METHOD HAVING MINIMAL TRANSMISSION DELAY

RELATED APPLICATIONS

The present application is based on, and claims priority from, Korean Application Number 2004-0086741, filed Oct. 28, 2004, the disclosure of which is incorporated by reference herein in its entirety.

BACKGROUND OF THE INVENTION

1. Field of the Invention

The present invention relates generally to an orthogonal frequency division multiplexing transmission technology and, more particularly, to an orthogonal frequency division multiplexing transmission apparatus and method that are implemented to minimize the transmission delay of a frame when the frame received from an upper layer is transmitted.

2. Description of the Prior Art

Recently, Internet telephones have been popularized, and several wireless Internet telephones using Wireless Local Area Network (WLAN) technologies based on the IEEE 802.11 standard have been commercialized.

One of the factors that must be considered to apply WLAN technologies to voice communication is a transmission delay problem. If the transmission delay between transmitting and receiving parties in voice communication is long, an echo may be generated and degrade the quality of communication. Accordingly, efforts to minimize transmission delay as much as possible must be made.

An OFDM scheme, that is, one of the WLAN technologies, is a digital modulation scheme for improving a transmission rate per unit bandwidth and preventing multi-path interference, and is a multi-carrier modulation scheme using a plurality of carriers that are orthogonal to one another. Furthermore, the OFDM scheme allows many carriers to be multiplexed compared to a common Frequency Division Multiplexing (FDM) scheme, so that the OFDM scheme has high frequency use efficiency and a transmission rate per unit bandwidth can be increased when the number of carriers increases.

A typical implementation example in which a transmitter is implemented using such an OFDM scheme is shown in FIG. 1. Generally, in an OFDM transmitter, data to be transmitted are transmitted to a scrambler 101 with a transmission rate set thereon. The data scrambled in the scrambler 101 are input to an interleaver 103 through a convolution encoder 102. The data are interleaved with each other in the interleaver 103. A constellation mapper 104 maps the interleaved data according to a transmission data rate, and then transmits the mapped data to a Radio Frequency (RF) converter 108 through an inverse fast Fourier transformer 105, a guard-interval inserter 106 and a symbol wave-shaping filter 107.

FIG. 2 is a schematic view illustrating the format of a frame that is transmitted from the OFDM transmitter of FIG. 1. When the frame shown in FIG. 2 is output through the OFDM transmitter of FIG. 1, a preamble 21 is output as ten short training symbols during the first 8 µs (microseconds) and then as two long training symbols during a subsequent 8 µs and a signal field 22 and a data field 23 are output as OFDM symbols on a 4 µs (i.e., a transmission interval basis) basis, as shown in FIG. 3.

In order to implement such a transmitter to have minimal transmission delay, it is required that the training symbols shown in FIG. 3 be output from the transmitter immediately after a data transmission request is generated. Although not particularly defined in the IEEE 802.11 standard, to fulfill the above-described condition, the transmitter must be constructed so that the training symbols corresponding to the preamble 21 are previously stored in a training symbol storage and generation unit 150, the training symbols are output from the training symbol storage and generation unit 150 immediately after a data transmission request is generated, and OFDM symbols that correspond to the signal field 22 and the data field 23 are output immediately after the output of the training symbols is completed, as shown in FIG. 4.

Conventionally, there is no particular requirement for how the OFDM transmitter is implemented so as to have minimal transmission delay. The construction of the OFDM transmitter shown in FIG. 4 may have a different purpose, and can be easily contrived by any person having a basic knowledge of electronic or communication engineering on the basis of the IEEE 802.11 standard.

An example of such construction is disclosed in U.S. Pat Appl. Pub No. 2004/0160892 A1 (published on Aug. 19, 2004) entitled "Orthogonal Frequency Division Multiplexing Transmitter System and VLSI Implementation Thereof." The system of the preceding patent is constructed in such a way that a time-domain preamble is previously stored in a memory, and is then transmitted without passing through other function blocks immediately after a data transmission request is generated. However, the preceding patent discloses only that very small transmission delay is achieved by causing the preamble to be directly output without passing through other function blocks, but does not disclose the time points at which a signal field and a data field will be output in consideration of the data processing of other function blocks. In other words, the preceding patent does not describe the time points at which the data of the signal field and the data field are requested from an upper layer while the training symbols of the preamble are output, in consideration of the data processing time of the function blocks. Accordingly, the implementation of an OFDM transmitter having minimal transmission delay, which the present invention attempts to achieve, has not been disclosed.

Meanwhile, an OFDM modulation/demodulation apparatus and method, which support a variable data rate in a WLAN system, are disclosed in Korean Pat No. 0375824 issued on Feb. 28, 2003. This patent provides the OFDM modulation/demodulation apparatus and method that can support a variable data rate prescribed in the IEEE 802.11a standard. In particular, the apparatus and method allow modulation and demodulation based on a data rate of 6 Mbps to 54 Mbps to be processed in a single device. However, this OFDM modulation/demodulation apparatus does not teach a method of implementing a transmission apparatus having minimal transmission delay.

SUMMARY OF THE INVENTION

The present invention provides an OFDM transmission apparatus and method having minimal transmission delay, which can output previously stored training symbols when a frame transmission request is received from an upper layer, and can output signal and data field request signals to the upper layer while the training symbols are output in consideration of the data processing time of function blocks so that the OFDM symbols of the signal and data fields are output immediately after the output of the training symbols is completed, thus minimizing transmission delay at the time of transmitting a frame.

The present invention provides an OFDM transmission apparatus having minimal transmission delay, the apparatus having a scrambler, a convolution encoder, an interleaver, a constellation mapper, an inverse fast Fourier transformer, a guard-interval inserter, a symbol wave-shaping filter and an RF converter, and transmitting a frame composed of a preamble, a signal field and a data field that are received from a MAC layer, that is, an upper layer, including a training symbol storage and generation unit for storing training symbols for the preamble, and outputting the stored training symbols when a training symbol output request signal is received; a delay unit for receiving data for the signal field from the MAC layer, delaying the received data by the data processing time of the scrambler, and then outputting the delayed data to the convolution encoder; and a controller for outputting the training symbol output request signal, requesting the preamble of the frame, to the training symbol storage and generation unit when a frame transmission request is received from the MAC layer, and outputting a data request signal, requesting the signal field and the data field, to the MAC layer in consideration of the total data processing time ($T_{PROCESS}$) required by components ranging from the scrambler to the guard-interval inserter; wherein the scrambler scrambles the received data for the data field of the transmitted frame, and then transmits the scrambled data to the convolution encoder.

The controller outputs the data request signal requesting the signal field to the MAC layer [total time required to output training symbols–$T_{PROCESS}$] after a time point at which the training symbols are output from the training symbol storage and generation unit.

In accordance with an embodiment of the present invention, the OFDM transmission apparatus further includes a FIFO unit that is provided with dual-port Random Access Memory (RAM) for storing the data, that is placed in front of the constellation mapper, and that differently processes a clock used to write the data into the dual-port RAM and a clock used to read the data from the dual-port RAM. In this case, the delay unit, the scrambler, the convolution encoder, the interleaver and the controller, which correspond to components located in front of the FIFO unit, may use a clock identical to a clock that is used when data are written into the FIFO unit; and the constellation mapper, the inverse fast Fourier transformer, the guard-interval inserter, the training symbol storage and generation unit and the symbol wave-shaping filter, which correspond to components located behind the FIFO unit, may use a clock identical to a clock that is used when data are read from the FIFO unit.

In order to accomplish the above object, the present invention provides an OFDM transmission method having minimal transmission delay in an OFDM transmission apparatus, the OFDM transmission apparatus having a scrambler, a convolution encoder, an interleaver, a constellation mapper, an inverse fast Fourier transformer, a guard-interval inserter, a symbol wave-shaping filter and an RF converter, and transmitting a frame composed of a preamble, a signal field and a data field that are received from a MAC layer, that is, an upper layer, including the first step of calculating total data processing time ($T_{PROCESS}$) required by components ranging from the scrambler to the guard-interval inserter and storing training symbols of a preamble of a frame to be transmitted; the second step of outputting the stored training symbols when a frame transmission request signal is received from the MAC layer; the third step of outputting a data request signal requesting a signal field of the frame to the MAC layer [total time required to output training symbols–$T_{PROCESS}$] after a time point at which the training symbols are output; the fourth step of delaying the data for the signal field, which is received from the MAC layer, by the processing time of the scrambler, and then outputting data for the signal field to the convolution encoder; and the fifth step of outputting the data request signal requesting the data field of the frame to the MAC layer after a transmission interval that is set based on a time point at which the data request signal requesting the signal field is output, and allowing the scrambler to scramble the received data and then output the scrambled data to the convolution encoder when the data for the data field are received from the MAC layer.

In accordance with an embodiment of the present invention, the OFDM transmission method may further include the sixth step of calculating total data processing time ($T_{AFTER-FIFO}$) required by components ranging from the constellation mapper to the guard-interval inserter that correspond to components located behind the FIFO unit; the seventh step of transmitting a FIFO access activation signal to the constellation mapper [total time required to output training symbols–$T_{AFTERFIFO}$] after a time point at which the training symbols are output; and the eighth step of transmitting a data request signal for reading data to the FIFO unit so that the FIFO unit outputs the data when the FIFO access activation signal is generated.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram illustrating the correlation between transmission information related to OFDM communication based on the IEEE 802.11 standard according to the present invention;

FIG. 8 is a chart illustrating a method of writing or reading data into or from RAM in first and second permutation processes performed by the interleaver in the OFDM transmitter based on the IEEE 802.11 standard according to the present invention;

FIG. 9 is a chart illustrating a method of reading data from a RAM in first and second permutation processes performed by the interleaver in the OFDM transmitter based on the IEEE 802.11 standard according to the present invention;

FIG. 12 is a chart illustrating a constellation mapping scheme in the OFDM transmitter based on the IEEE 802.11 standard according to the present invention;

DESCRIPTION OF THE PREFERRED EMBODIMENTS

Figure 1:
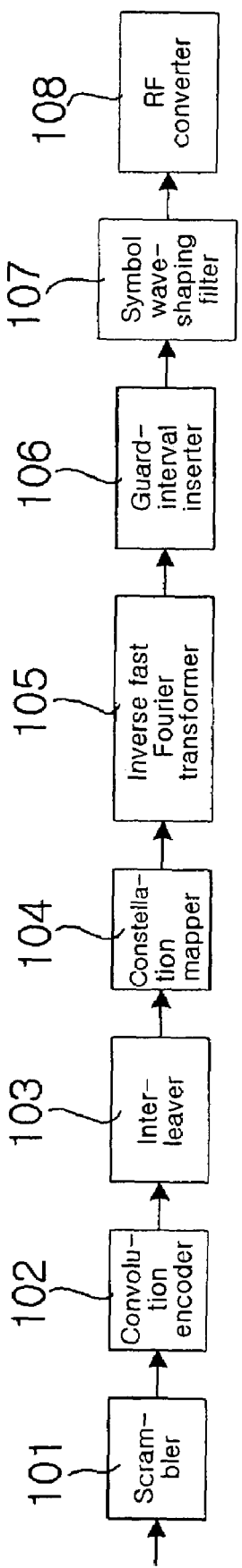
FIG. 1 is a schematic diagram illustrating the construction of a typical OFDM transmitter based on the IEEE 802.11 standard.

Reference now should be made to the drawings, in which the same reference numerals are used throughout the different drawings to designate the same or similar components.

When an OFDM transmission apparatus and method according to the present invention are described below, the components of the conventional OFDM transmitter, which are shown in FIGS. 1 to 4 and can be applied to the present invention in the same manner, will be used without change for ease of description. Furthermore, the format of the frame that is transmitted from the OFDM transmission apparatus, the training symbols and the OFDM symbols, which are shown in FIGS. 1 to 4, will be used for the description of the present invention.

Figure 5:
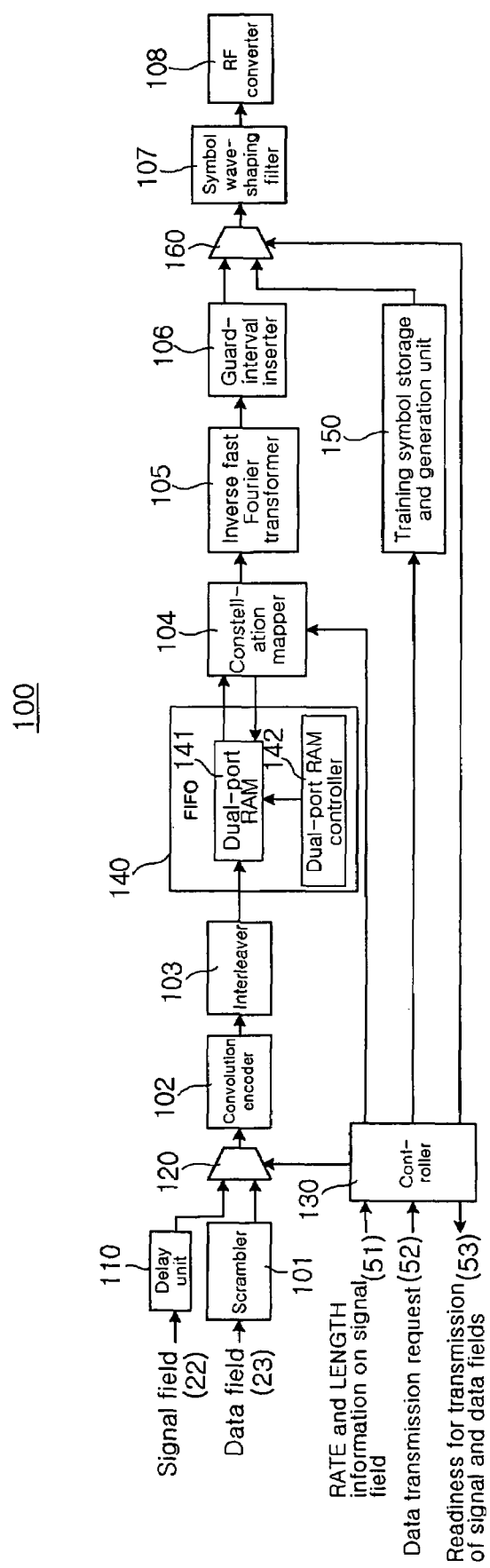
FIG. 5 is a schematic diagram illustrating the construction of an OFDM transmission apparatus having minimal transmission delay according to an embodiment of the present invention.

FIG. 5 is a schematic diagram illustrating the construction of an OFDM transmission apparatus having minimal transmission delay according to an embodiment of the present invention. As shown in FIG. 5, the OFDM transmission apparatus 100 having minimal transmission delay according to the present invention includes a delay unit 110, a scrambler 101, a controller 130, a convolution encoder 102, an interleaver 103, a FIFO (First-In First-Out) unit 140, a constellation mapper 104, an inverse fast Fourier transformer 105, a guard-interval inserter 106, a training symbol storage and generation unit 150, a symbol wave-shaping filter 107 and a Radio Frequency (RF) converter 108. In this case, the FIFO unit 140 is used to provide flexibility to the use of clocks by the transmission apparatus 100, and may be omitted depending on the design. Reference numerals 120 and 160 designate signal selectors.

The OFDM transmission apparatus 100 shown in FIG. 5 according to the present invention exchanges data with an upper-layer processor. Preferably, the OFDM transmission apparatus 100 exchanges data with a Media Access Control (MAC) layer (not shown) that generates a signal field and a data field, which constitute an OFDM frame, or receives a signal field and a data field in response to an external control signal. Accordingly, the controller 130 of the OFDM transmission apparatus 100 according to the present invention receives a frame data transmission request from the MAC layer, extracts a data rate (RATE) and a data length (LENGTH) from a signal field, and outputs a signal field data request signal to the MAC layer. Furthermore, the delay unit 110 of the OFDM transmission apparatus 100 according to the present invention receives signal field data from the MAC layer. The scrambler 101 receives data field data from the MAC layer. This operation is described in detail below.

A detailed operation of the OFDM transmission apparatus 100 having minimal transmission delay according to the present invention is described in detail with reference to FIGS. 2 to 5.

Figure 3:
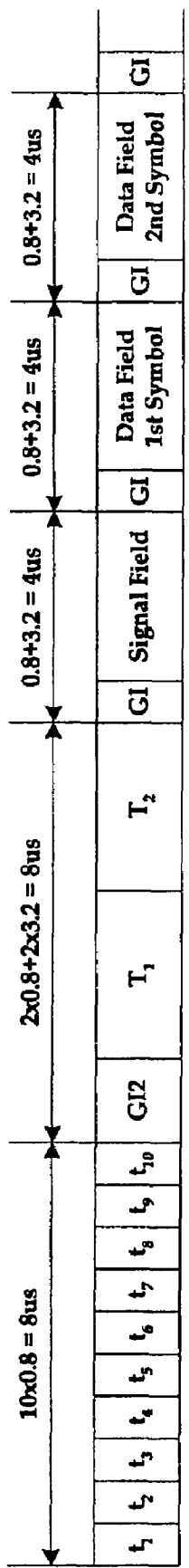
FIG. 3 is a diagram illustrating the structure of OFDM symbols that are output from the OFDM transmitter based on the IEEE 802.11 standard.

The controller 130 controls the output of training symbols, requests the signal field 22 of the frame 200, which will be transmitted, from the MAC layer, that is, an upper layer, extracts RATE and LENGTH from the signal field 22, requests the data field 23 of the frame 200, which will be transmitted, from the MAC layer, and controls the time points at which the training symbols of the preamble and the OFDM symbols of the signal and data fields are output. The controller 130 transmits a training symbol output request signal to the training symbol storage and generation unit 150 immediately after a frame data transmission request signal 52 is generated by the MAC layer. That is, the training symbol storage and generation unit 150 stores the training symbols of a frame to be transmitted, and outputs the stored training symbols when the training symbol output request signal is received from the controller 130. As described above, the controller 130 according to the present invention generates the training symbol output request signal immediately after the frame data transmission request signal is generated by the upper layer, so that the training symbols can be output without time delay. Accordingly, the OFDM transmission apparatus 100 of the present invention can reduce transmission delay. The training symbols are composed of ten short training symbols, a guard interval corresponding to 1.6 μs, and two long training symbols, as shown in FIG. 3. The interval of a training symbol is 16 μs, as shown in FIG. 3. The interval of the training symbol (the total time required to output the training symbols) conforms to the IEEE 802.11 standard, but may be variously set if necessary.

Figure 2:
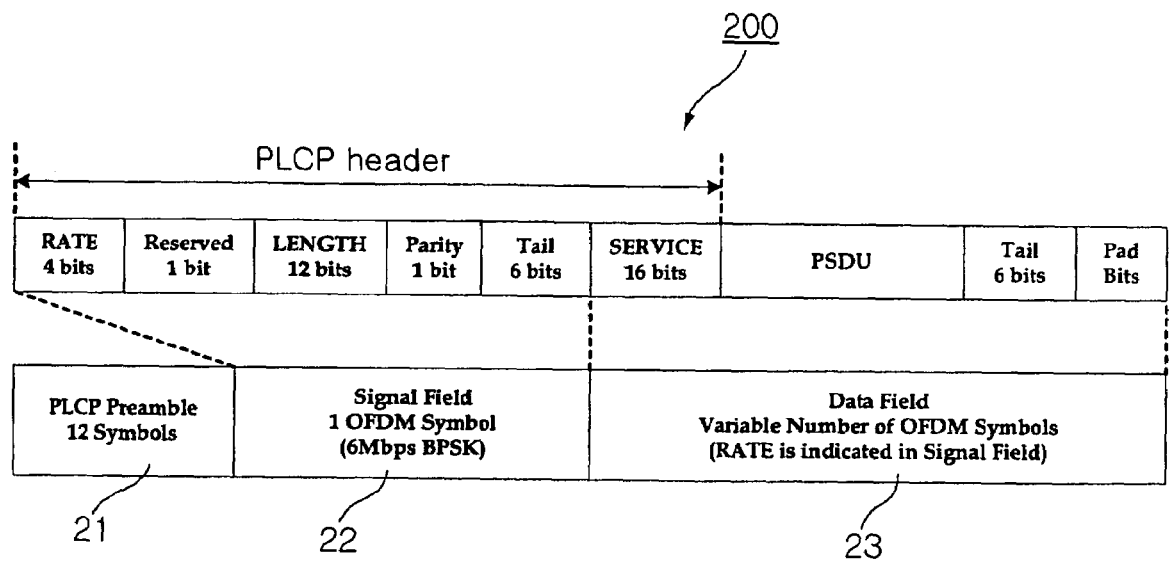
FIG. 2 is a schematic diagram illustrating the format of a frame that is transmitted through the OFDM transmitter based on the IEEE 802.11 standard.

Referring to FIG. 5, the signal field 22 of the frame 200 shown in FIG. 2 is input to the convolution encoder 102 through the delay unit 110 without passing through the scrambler 101. In contrast, the data field 23 of the frame 200 passes from the scrambler 101 through all the function blocks 102 to 108 except the delay unit 110, the controller 130 and the training symbol storage and generation unit 150. In order for the transmission apparatus 100 to have minimal transmission delay, it is required that OFDM symbols corresponding to the signal field be output immediately after the training symbols are output in such a way as to request the signal field 22 and the data field 23 from the upper layer while the training symbols are output in consideration of the data processing time of the function blocks of the transmission apparatus 100. Accordingly, the controller 130 outputs a control signal, which indicates readiness for the transmission of the signal field 22, to the MAC layer so that the data of the signal field 22 can be transmitted. The signal field 22 of the frame 200 is composed of RATE, Reserved, LENGTH, Parity and Tail, as shown in FIG. 2. In this case, RATE indicates a data rate at which data is processed in the transmission apparatus 100 of FIG. 5, as shown in FIG. 6 (that conforms to the IEEE 802.11a standard). In the frame 200, a Physical Layer Convergence Protocol Service Data Unit (PSDU) is composed of octet-based data, and LENGTH indicates the number of octets. A constellation mapping scheme that is performed in the constellation mapper 104 and the number of data bits that are contained in each OFDM symbol vary with the RATE. For example, in the example of the frame 200 shown in FIG. 2, the signal field 22 has a data rate of 6 Mbps, employs a BPSK constellation mapping scheme, and is 24-bit data. Accordingly, in this case, as in FIG. 7, a control signal indicating readiness for the transmission of the signal field is activated during the interval to receive 24-bit data corresponding to the signal field 22. The 24-bit data corresponding to the signal field 22, which is input to the transmission apparatus 100 of the present invention in response to the control signal indicating readiness for the transmission of the signal field, is input to the controller 130 and the convolution encoder 102 in the same manner. The controller 130 performs control so that the convolution encoder 102 processes the data of the signal field 22, not the output of the scrambler 101. That is, the signal field 22 is processed through the delay unit 110, the convolution encoder 102, the interleaver 103, the FIFO unit 140, the constellation mapper 104, the inverse fast Fourier transformer 105, the guard-interval inserter 106, the symbol wave-shaping filter 107, and the RF converter 108.

Figure 7:
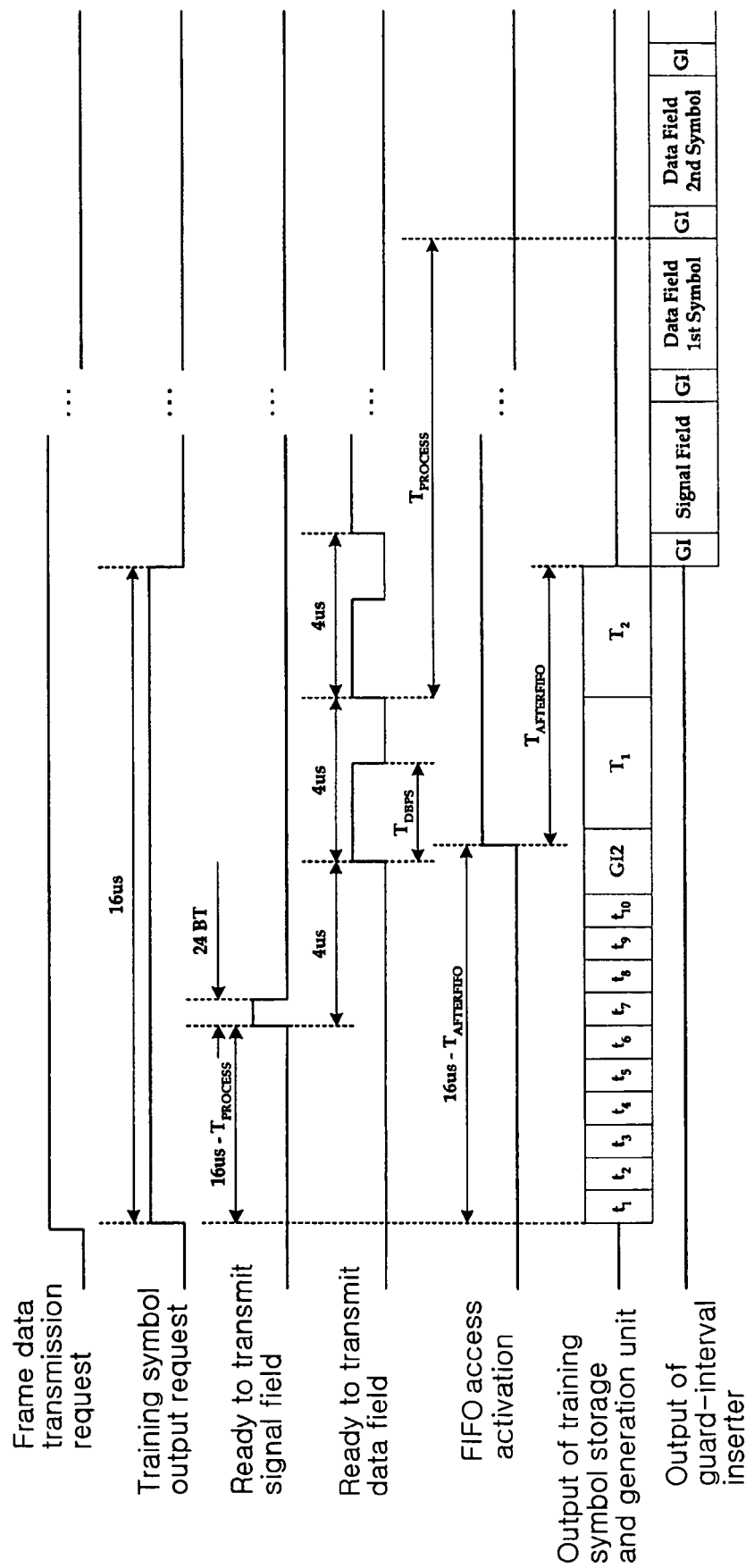
FIG. 7 is a diagram illustrating the correlation between control signals that are output from a controller according to an embodiment of the present invention.

If the total processing time required by the convolution encoder 102, the interleaver 103, the FIFO unit 140, the constellation mapper 104, the inverse fast Fourier transformer 105 and the guard-interval inserter 106 in the transmission apparatus 100 shown in FIG. 5 according to the present invention is assumed to be $T_{SIG}$, the controller 130 must generate a control signal indicating readiness for the transmission of the signal field so that the data of the signal field 22 can be input to the convolution encoder 102 [16 μs–$T_{SIG}$] after the time point at which training symbols are output from the training symbol storage and generation unit 150. However, in order for the control signal indicating readiness for the transmission of the signal field or data field to be generated at 4-μs intervals, that is, transmission intervals, it is required that after the control signal indicating readiness for the transmission of the signal field has been generated and before the data of the signal field 22, which are input to the transmission apparatus 100, is input to the convolution encoder 102, the data of the signal field 22 be delayed through the delay unit 110 by the processing time of the scrambler 101 and then input to the convolution encoder 102. Furthermore, when the total data processing time of the scrambler 101, the convolution encoder 102, the interleaver 103, the FIFO unit 140, the constellation mapper 104, the inverse fast Fourier transformer 105 and the guard-interval inserter 106 in the transmission apparatus 100 is assumed to be $T_{PROCESS}$ (<16 μs), it is required that the controller 130 generate the control signal, which indicates readiness for the transmission of the signal field, [16 μs–$T_{PROCESS}$] after the time point at which the training symbols are output from the training symbol storage and generation unit 150, as shown in FIG. 7. In this case, the above-referenced 16 μs refers to the total time required to output the training symbols, as shown in FIG. 2, and is the same hereinafter.

Furthermore, in order for the guard-interval inserter 106 to output OFDM symbols corresponding to the signal field 22 and the data field 23 at the time point at which the training symbol storage and generation unit 150 completes the generation of the training symbols, when the total data processing time of the constellation mapper 104, the inverse fast Fourier transformer 105 and the guard-interval inserter 106 in the transmission apparatus 100 is assumed to be $T_{AFTERFIFO}$, it is required that the controller 130 transmit a signal indicating FIFO access activation to the constellation mapper 104 [16 μs–$T_{AFTERFIFO}$] after the time point at which the training symbols are output from the training symbol storage and generation unit 150, and that the constellation mapper 104 transmit a FIFO data request signal, which commands that data be read from the FIFO unit 140, to the FIFO unit 140 when the FIFO access activation signal is received, thus starting to process data output from the FIFO unit 140, as shown in FIG. 7.

The controller 130 acquires and stores RATE and LENGTH information from the signal field 22 that is input by the MAC layer. As shown in FIG. 7, the controller 130 generates a control signal indicating readiness for the transmission of the data field, as shown in FIG. 5, so as to receive data corresponding to the data field 23 of the frame 200 of FIG. 2 4 μs, that is, a transmission interval, after the time point at which the control signal indicating readiness for the transmission of the signal field is generated. The activation interval ($T_{DBPS}$) of the control signal indicating readiness for the transmission of the data field must be maintained so that data the number of which is identical to the number of bits $N_{DBPS}$ corresponding to one OFDM symbol can be input from the MAC layer to the transmission apparatus 100 of the present invention according to the RATE information, as shown in FIG. 6. In this case, in order to receive the data corresponding to the data field 23 of the frame 200 4 μs, that is, the transmission interval, after the time point at which the control signal indicating readiness for the transmission of the signal field is generated, the above-described process is repeated. Furthermore, according to the LENGTH information, the process is repeated at 4-μs intervals until the entire data field 23 including SERVICE, PSDU, Tail and Pad Bits is input to the transmission apparatus 100, as shown in FIG. 2.

The request for the data field 23 is described in more detail below. In the frame 200, the data request signal requesting the data field 23 is generated at 4-μs intervals. A valid interval for the data request signal may vary with the RATE information. The repetition of the generation of the data request signal is dependent upon the LENGTH information. That is, since information on how many bytes are used to construct the data field 23 when the MAC layer constructs the frame 200 is contained in the LENGTH information, the data request signal requesting the data field 23 is repeatedly generated at 4-μs intervals, that is, the transmission intervals, until all of the data of the data field corresponding to the length is received. Furthermore, whenever the transmission of a frame begins, a data rate RATE is determined in the upper layer. One is selected from eight data rates shown in FIG. 6 and information about the data rate is contained in the RATE information. The length of the data request signal (the length indicating the valid interval) requesting the data field 23 shown in FIG. 7 varies with the RATE information. Accordingly, until all the data contained in the frame 200 to be currently transmitted are transmitted, a process, in which the data request signal requesting the data field 23 is transmitted to the MAC layer at preset periods and the scrambler 101 scrambles received data and then outputs the scrambled data to the convolution encoder 102 when the data of the data field 23 is received from the MAC layer, is repeated.

As described above, the scrambler 101 receives only the data field 23 of the frame 200 to be transmitted from the MAC layer, scrambles the data field 23, and then outputs the scrambled data to the convolution encoder 102. Furthermore, the delay unit 110 receives only the signal field 22 of the frame from the MAC layer, delays the signal field 22 by the data processing time of the scrambler 101, and then outputs the delayed signal field 22. That is, when the time ranging from the time point at which the data field 23 is input to the scrambler 101 to the time point at which the data field 23 is output from the scrambler 101 is assumed to be $T_{SCRAMBLER}$, the delay unit 110 delays the received signal field 22 by $T_{SCRAMBLER}$, and then outputs the delayed signal field to the convolution encoder 102.

The scrambler 101 is used to prevent the generation of long intervals having the same values in a data string to be transmitted. The scrambler is implemented based on a generator polynomial $S(x)=x^7+x^4+1$ that conforms to the IEEE 802.11 standard. When the scrambler is implemented using hardware, it can be implemented using a shift register, which uses a flip-flop, and a digital logic circuit. The scrambler 101 generates a bit string corresponding to 1 or 0 based on the generator polynomial, performs an exclusive OR operation on the bit string and a data bit string input to the scrambler 101, and outputs the operation results.

The convolution encoder 102 is used to allow a receiver to correct an error when the error occurs in a transmitted data string. The convolution encoder 102 is implemented based on generator polynomials $g_0=133_8$ and $g_1=171_8$ that conform to the IEEE 802.11 standard. When the convolution encoder 102 is implemented using hardware, it can be implemented using a shift register, which uses a flip-flop, and a digital logic circuit. The convolution encoder 102 generates a bit string corresponding to 1 or 0 based on the generator polynomials, performs an XOR operation on the bit string and a data bit string input to the convolution encoder 102, and then outputs the operation results. Furthermore, it is preferred that the output of the convolution encoder 102 be output in a 2-bit parallel manner because the results of the two generator polynomials exist in parallel.

The interleaver 103 is used to convert burst errors into small random errors that are distributed to various locations, in consideration of the fact that the burst errors, which are concentrated at some locations, occur while data is transmitted via a transmission medium. The interleaver 103 performs a first permutation process and a second permutation process. The first permutation process is implemented based on a permutation equation $i=(N_{CBPS}/16(k \bmod 16)+\mathrm{floor}(k/16)$ (where $k=0, 1, \ldots, N_{CBPS}-1$) that conforms to the IEEE 802.11 standard. The second permutation process is implemented based on a permutation equation $j=s \times \mathrm{floor}(i/s)+(i+N_{CBPS}-\mathrm{floor}(16 \times i/N_{CBPS})) \bmod s$ (where $i=0, 1, \ldots, N_{CBPS}-1$) that conforms to the IEEE 802.11 standard. In the two permutation equations, k is each bit index of a bit string before the first permutation process, i is an index at which a bit located at a kth location before the first permutation process is located after the first permutation process, j is an index at which a bit located at an ith location before the second permutation process is located after the second permutation process, mod is a modulo operation, floor( ) is the largest integer that does not exceed the value in parentheses, $N_{CBPS}$ is the number of coded bits per OFDM symbol, $s=\max(N_{BPSC}/2, 1)$, $N_{BPSC}$ is the number of coded bits per sub-channel that constitutes an OFDM transmission band, and max( ) is the largest value in parentheses.

Figure 8:
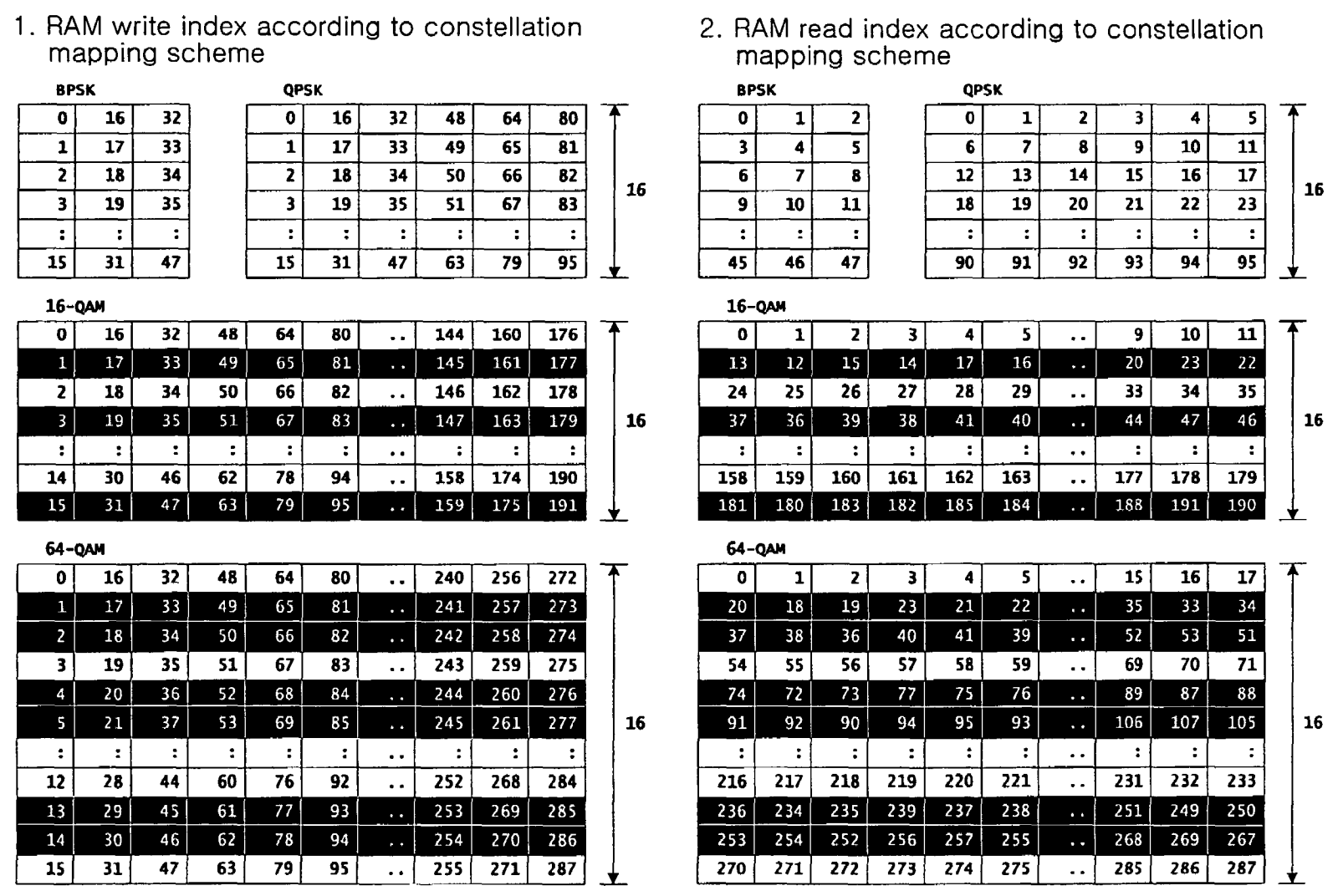

When the interleaver 103 is implemented using hardware, it is constructed using Random Access Memory (RAM) and an interleaver controller for writing or reading data into or from the RAM. In order to perform the first and second permutation processes, the sequence in which data are written into or read from the RAM must be the same as that shown in FIG. 8. However, this is only an example for describing the first and second permutation processes. In order to systematically implement the interleaver 103, the constellation mapper 104, which is a function block next to the interleaver, must be considered. The constellation mapper 104 groups a maximum of 3 bits and represents them using a single real number to construct an inphase component and a quadrature component. In consideration of this, the number of bits, which are simultaneously output when data are output from the RAM, can be determined according to a constellation mapping scheme. Accordingly, in the interleaver 103, one bit is output from the RAM at a time in the case of BPSK, two bits are output from the RAM at a time in the case of QPSK, four bits are output from the RAM at a time in the case of 16-QAM, and six bits are output from the RAM at a time in the case of 64-QAM. This will be described in more detail below.

Figure 9:
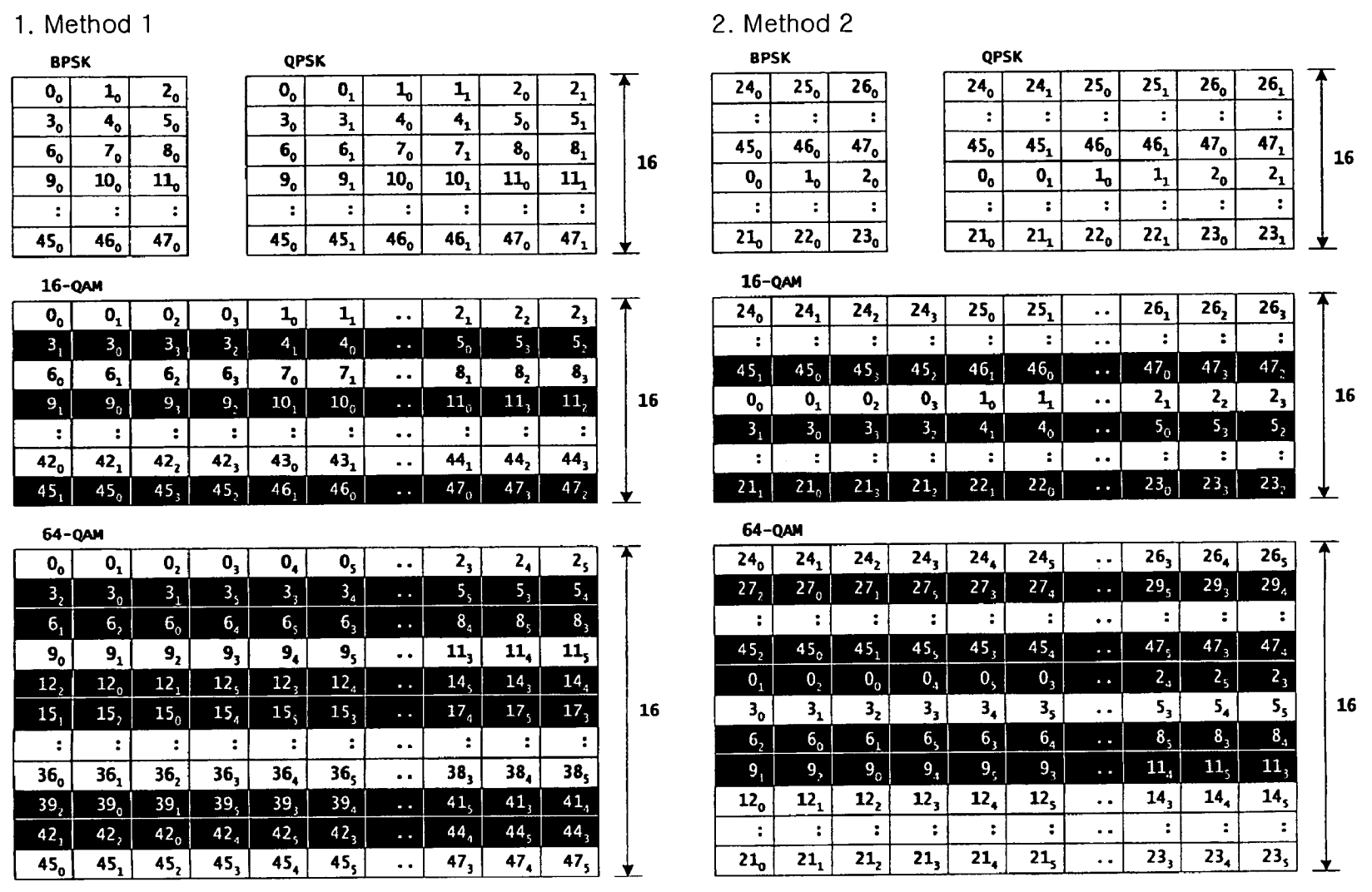

When an index indicating the position in the sequence in which data are output from a RAM is assumed to be n (=0, 1, . . . , 47) and a location where each of the bits is located when the bits output at the same time are input to the constellation mapper is assumed to be b (=0, 1, 2, 3, 4, 5), data are output from RAM in the manner shown in FIG. 9 when the index and location of a bit are represented as $n_b$ at the time at which data are output from the RAM. As shown in FIG. 9, the sequence in which data are output from the RAM may vary with a method of implementing an inverse fast Fourier transformer in consideration of a sub-carrier frequency allocation scheme defined in the standard. In order to implement the scheme shown in FIG. 9, the RAM must be divided into at least 6 blocks.

Referring to FIG. 6, since the number of bits written into the RAM according to the constellation mapping scheme is $N_{CBPS}$, the time taken to write data into the RAM is also proportional to $N_{CBPS}$. In detail, the time taken to write data into the RAM is determined depending on the scheme by which the convolution encoder 102 outputs data and $N_{CBPS}$ which is based on a transmission data rate RATE. When the output of the convolution encoder 102 is output in a two-bit parallel manner as described above, the time taken to write the data into the RAM is $N_{CBPS} \times 0.5$ BT (Bit Time). For example, in the case of 16-QAM, in which a 40 MHz clock is used and a data rate is 24 Mbps, $N_{CBPS}=192$, so that the time taken to write data into the RAM is $192 \times 0.5 \times 0.025=2.4$ μs. However, in the case of 16-QAM, in which the output of the convolution encoder 102 is output in a 1-bit serial manner and a data rate is 24 Mbps, the time is $192 \times 0.025=4.8$ μs when a 40-MHz clock is used. Accordingly, since only the time taken to write the data into the RAM exceeds a 4-μs interval, a clock that is faster than the 40-MHz clock must be used. As described above, when bits are simultaneously output according to a constellation mapping scheme at the time of the output of data from the RAM, the time taken for the RAM to read data is constant. This is described in more detail below.

Figure 10:
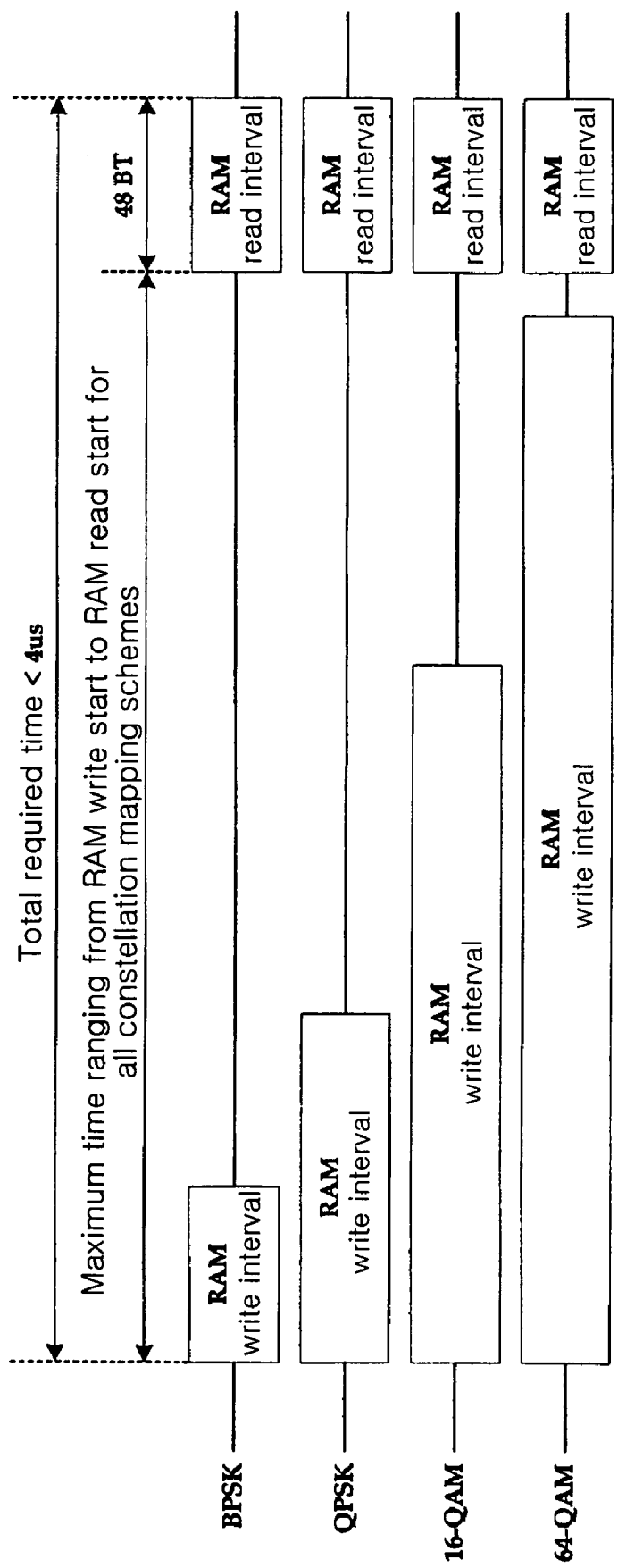
FIG. 10 is a diagram showing the correlation between control signals for writing or reading data into or from the RAM of the interleaver according to the present invention.

If the time taken for the RAM to read data is calculated in consideration of the total number of bits that are written into the RAM according to a constellation mapping scheme, versus the number of bits that are simultaneously output when the data are output from the RAM, the time is 48 BT in the case of BPSK, 96/2 BT in the case of QPSK, 192/4 BT in the case of 16-QAM, and 288/6 BT in the case of 64-QAM. As described above, the time taken for the RAM to read the data is constant for all the constellation mapping schemes. In order to keep $T_{PROCESS}$ constant for all the constellation mapping schemes, the controller sets the time point at which data are read from the RAM to the same time point for all the constellation mapping schemes on the basis of the time point at which the data are written into the RAM, as shown in FIG. 10. However, the time ranging from the time point at which data begins to be written into the RAM to the time point at which the last data are read from the RAM must be less than 4 μs.

The FIFO unit 140 is used to provide flexibility to the use of a clock in the transmission apparatus 100 of the present invention. The FIFO unit 140 is preferably composed of dual-port RAM 141 and a dual-port RAM controller 142. The dual-port RAM 141 generally includes a data input port, a data output port, a read/write control input port, an operation clock input port, a chip actuation input port and a RAM access address input port, which are designed in a dual manner. Furthermore, memory cells, which correspond to the same physical location, can be accessed based on RAM access addresses corresponding to respective ports. Accordingly, data can be read from the dual-port RAM 141 through one port, while data are written into the dual-port RAM 141 through the other port. The clock used to write data and the clock used to read data can be different. The dual-port RAM controller 142 controls both an operation of writing data into the dual-port RAM 141 and an operation of reading data from the dual port RAM 141. The clock used to write data into the dual-port RAM 141 and the clock used to read data from the dual-port RAM 141 can be separate. That is, the delay unit 110, the scrambler 101, the convolution encoder 102, the interleaver 103 and the controller 130, which correspond to components located in front of the FIFO unit 140, use a clock identical to a clock that is used to write data into the dual-port RAM 141 of the FIFO unit 140. The constellation mapper 104, the inverse fast Fourier transformer 105, the guard-interval inserter 106, the training symbol storage and generation unit 150 and the symbol wave-shaping filter 107 that correspond to components located behind the FIFO unit, uses a clock identical to a clock that is used to read data from the dual-port RAM 141 of the FIFO unit 140. When data are written into the dual-port RAM, data generated by the interleaver 103 and a control signal indicating a data valid interval are used. When data are output from the dual-port RAM, a FIFO data request signal generated by the constellation mapper is used.

The constellation mapper 104 functions to group a bit string into 1-bit, 2-bit, 4-bit or 6-bit groups and represent he groups as one value so as to obtain a desired data rate based on the RATE information. Furthermore, the constellation mapper 104 also performs a null insertion function and a pilot insertion function. The constellation mapper 104 transmits a FIFO data request signal to the FIFO unit 140 when a FIFO access activation signal is generated by the controller. Data input to the constellation mapper 104 is separated into an inphase component and a quadrature component. Each of the inphase component and the quadrature component is then grouped into 1-bit, 2-bit or 3-bit groups according to a constellation mapping scheme, and is then converted into a value. The constellation mapper 104 processes the data output from the interleaver 103, so that when the interleaver that outputs data in the form shown in FIG. 9 is used, the constellation mapper 104 can separate received data into an inphase component and a quadrature component without grouping the data and process the received data according to a constellation mapping scheme.

Figure 11:
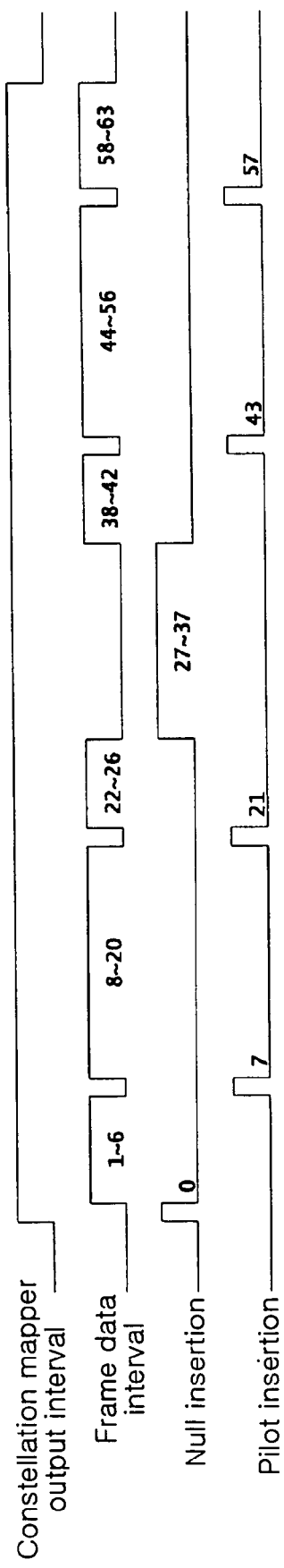
FIG. 11 is a diagram illustrating the correlation between signals for controlling the output of the constellation mapper according to an embodiment of the present invention.

When data input to the constellation mapper 104 are assumed to be n, the location of each of the bits that constitute the data n is assumed to be b (=0, 1, 2, 3, 4, 5), and a bit at the location b in data n is assumed to be $n_b$, the constellation mapper 104 produces an inphase component and a quadrature component in the same manner shown in FIG. 12. A null insertion location and a pilot insertion location can vary with the method by which the interleaver 103 outputs data in consideration of a sub-carrier frequency allocation method defined in the standard. For example, when a method by which the interleaver 103 outputs data corresponds to a method 2 shown in FIG. 9, a null insertion location, a pilot insertion location, and the interval location of data that is output from the FIFO unit can be controlled in the same manner as shown in FIG. 11. In this case, when a data request signal is transmitted to the FIFO unit, it must be transmitted in the same manner as the frame data field signal of FIG. 11 is transmitted. In FIG. 11, numbers indicate corresponding indices when the numbers are output from the constellation mapper.

The inverse fast Fourier transformer 105 performs a 64-Point Inverse Fast Fourier Transform (IFFT) function. Generally, when the size of IFFT or FFT can be represented as $r^m$, r is called a radix. The radix is typically 2, 4 or 8. The inverse fast Fourier transformer 105 required for the transmission apparatus 100 according to the present invention is not greatly restricted by the processing time and the processing rate, so that the inverse fast Fourier transformer 105 can be implemented using an inverse fast Fourier transformer having a typical pipeline structure.

The guard-interval inserter 106 functions to insert a data string composed of 16 pieces of data, which corresponds to a guard interval, before a data string composed of 64 pieces of data, which is output from the inverse fast Fourier transformer 105, and output a data string composed of a total of 80 pieces of data. Generally, the 16 pieces of data corresponding to the guard interval employ data corresponding to lower 16 of the 64 pieces of data that are output from the inverse fast Fourier transformer 105. The guard-interval inserter 106 can include RAM and a guard interval insertion controller. The total time ranging from the time point at which a data string input to the guard-interval inserter 106 is written into the RAM to the time point at which the data string is output along with the guard interval exceeds the OFDM symbol interval 4 µs. Therefore, implementation is performed by dividing the RAM into two blocks or using dual-port RAM so that the interval in which a data string corresponding to the 64 pieces of data, which are output from the inverse fast Fourier transformer, is written into the RAM and the interval in which the data string is output from the RAM can be 4 µs. If the dual-port RAM is used, the clock used to write the data string into the dual-port RAM and the clock used to read the data string from the dual-port RAM are the same. In this case, write and read control is performed in the same manner as shown in FIG. 13.

Figure 13:
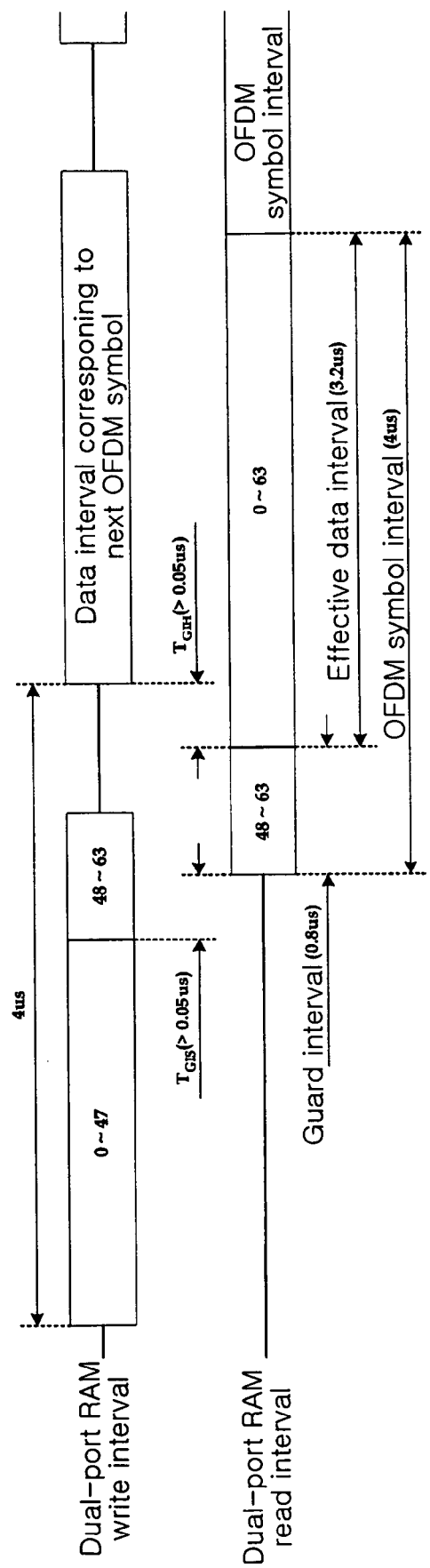
FIG. 13 is a diagram illustrating the correlation between control signals for writing or reading into or from a dual-port RAM in a guard-interval inserter having the dual-port RAM according to an embodiment of the present invention.

In FIG. 13, a data index indicates a position in the sequence in which data are transmitted in an OFDM symbol in a time domain after the inverse fast Fourier transformer 105 outputs the data. There is a case where data output from the inverse fast Fourier transformer 105 have a bit-reversed index according to a method of implementing an inverse fast Fourier transformer. In this case, a process in which data are made to have a correct transmission sequence in a time domain is necessary, which can be easily achieved by controlling a write address. The interval between data strings that are output from the guard-interval inserter 106 is set to 0.05 µs (=1/20 MHz). For example, when a clock used for function blocks that correspond to the components located behind the FIFO unit is 40 MHz, the guard-interval inserter must output the same data twice.

The training symbol storage and generation unit 150 functions to store training symbols shown in FIG. 3 in a storage device such as ROM (Read Only Memory), and output the stored training symbols when the training symbol output request signal is generated by the controller 130. The training symbols are composed of OFDM symbols that are obtained by performing an IFFT operation on the PLCP preamble 21 shown in FIG. 2 using the inverse fast Fourier transformer 105. The training symbol storage and generation unit 150 can include ROM and a training symbol generating controller.

The symbol wave-shaping filter 107 is used to reduce the spectral sidelobe of a frequency spectrum that is generated on a transmission medium through the transmission apparatus 100. The symbol wave-shaping filter 107 can be implemented in the form of a time domain window that is defined in the standard, or in the form of a Finite Impulse Response (FIR) filter having a common low pass function.

The RF converter 108 functions to move a data transmission band to a frequency band that is used to transmit data on a transmission medium.

Figure 14:
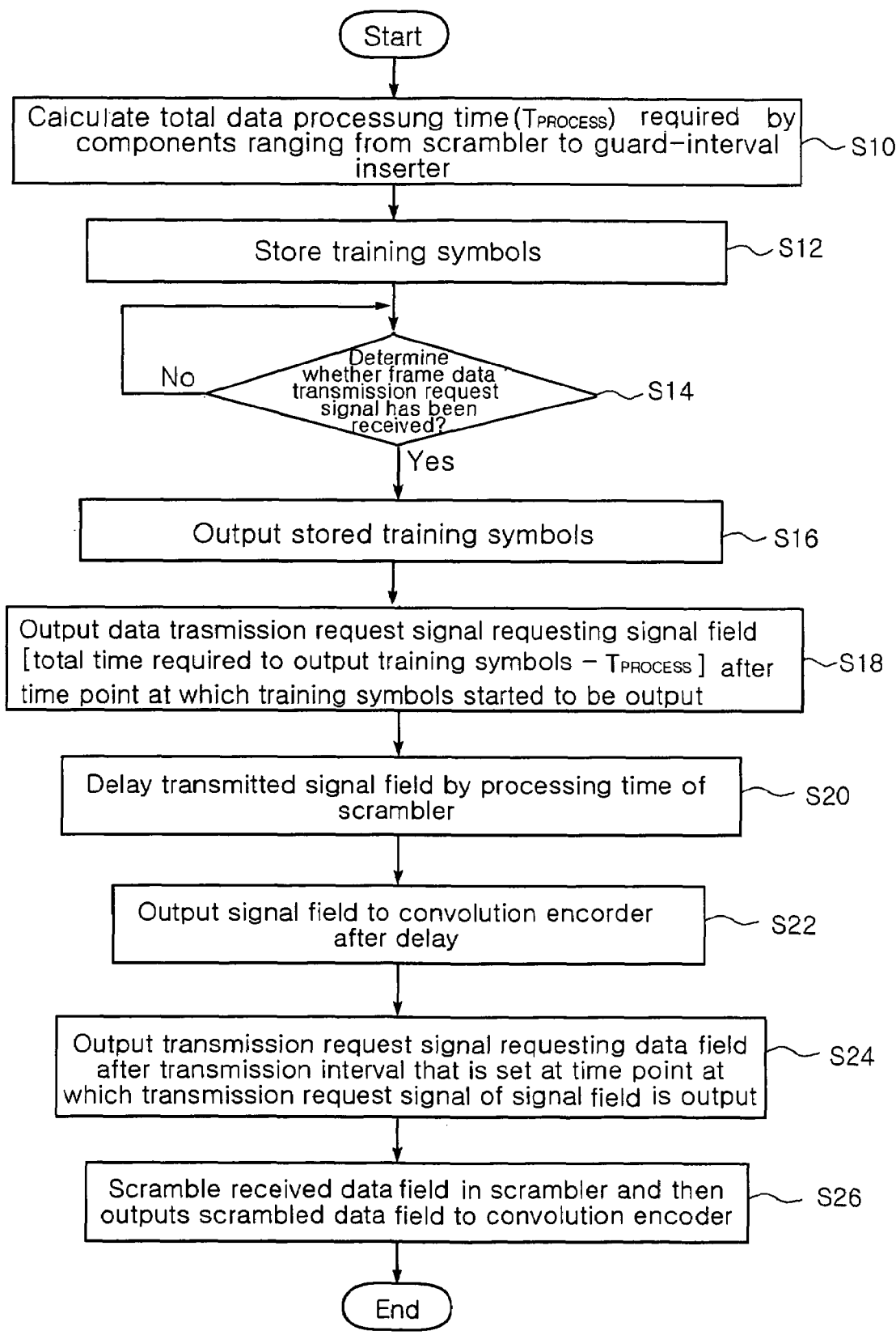
FIG. 14 is a flowchart illustrating an OFDM transmission method having minimal transmission delay according to an embodiment of the present invention.

FIG. 14 is a flowchart illustrating an OFEM transmission method having minimal transmission delay according to an embodiment of the present invention. The flowchart shown in FIG. 14 can be preferably implemented in the above-described OFDM transmission apparatus. The OFDM transmission method having minimal transmission delay according to the present invention is described with reference to the above-described drawings and FIG. 14 below.

As described above, the OFDM transmission apparatus 100, including the scrambler 101, the convolution encoder 102, the interleaver 103, the constellation mapper 104, the inverse fast Fourier transformer 105, the guard-interval inserter 106, the symbol wave-shaping filter 107, the RF converter 108, the delay unit 110, the controller 130 and the training symbol storage and generation unit 150, exchanges data and signals with a MAC layer, and receives a transmission frame 200 from the MAC layer and transmits the transmission frame 200 to the next stage. The transmission frame 200 is composed of a preamble, a signal field and a data field. Referring to FIG. 14, the controller 130 calculates the total data processing time ($T_{PROCESS}$) required by the components ranging from the scrambler 101 to the guard-interval inserter 106 through the interleaver 103, the constellation mapper 104 and the inverse fast Fourier transformer 105 at step S10. The training symbol storage and generation unit 150 stores the training symbols of a frame to be transmitted at step S12. The controller 130 determines whether a frame data transmission request signal has been received from the MAC layer at step S14. If the frame data transmission request signal has not been received from the MAC layer, the controller 130 continues to wait for the signal. If the request signal has been received, the controller 130 transmits a training symbol output request signal to the training symbol storage and generation unit 150, so that the training symbol storage and generation unit 150 outputs the stored training symbols at step S16.

While the training symbols are output, the controller 130 outputs a data transmission request signal requesting the signal field to the MAC layer [the total time required to output training symbols−$T_{PROCESS}$] after the time point at which the training symbols begin to be output at step S18. The delay unit 110 receives the signal field from the MAC layer, delays the signal field by the processing time of the scrambler 101 at step S20, and then outputs the delayed signal field to the convolution encoder 102 at step S22. The controller 130 then transmits a transmission request signal requesting the data field to the MAC layer after a transmission interval that is set on the basis of the time point at which the data transmission request signal requesting the signal field is output to the MAC layer at step S24. The scrambler scrambles the data field that is received from the MAC layer, and then outputs the scrambled data field to the convolution encoder 102 at step S26.

As described above, in order for the training symbols to be output immediately after the frame transmission request signal is received from the MAC layer, that is, an upper layer, and in order for the signal field to be output at the time point at which the output of the training symbols is completed, the controller outputs the request signal requesting the signal field and the data field to the MAC layer while the training symbols are output, in consideration of the total data processing time ($T_{PROCESS}$) required by the components ranging from the scrambler to the guard interval inserter. If the signal field is received, the controller performs control so that the delay unit 110 delays the signal field by the processing time of the scrambler 101 and then outputs the delayed signal field to the convolution encoder. In contrast, if the data field is received, the controller performs control so that the scrambler scrambles the data field and then outputs the scrambled data field to the convolution encoder. Although not shown in the drawings, the output of the delay unit 110 and the scrambler 101 is activated by the controller 130, and the activated interval conforms to the transmission interval of the transmission apparatus 100. Accordingly, when the training symbols of a preamble, and the data of a signal field and a data field are transmitted, transmission delay can be minimized.

Figure 15:
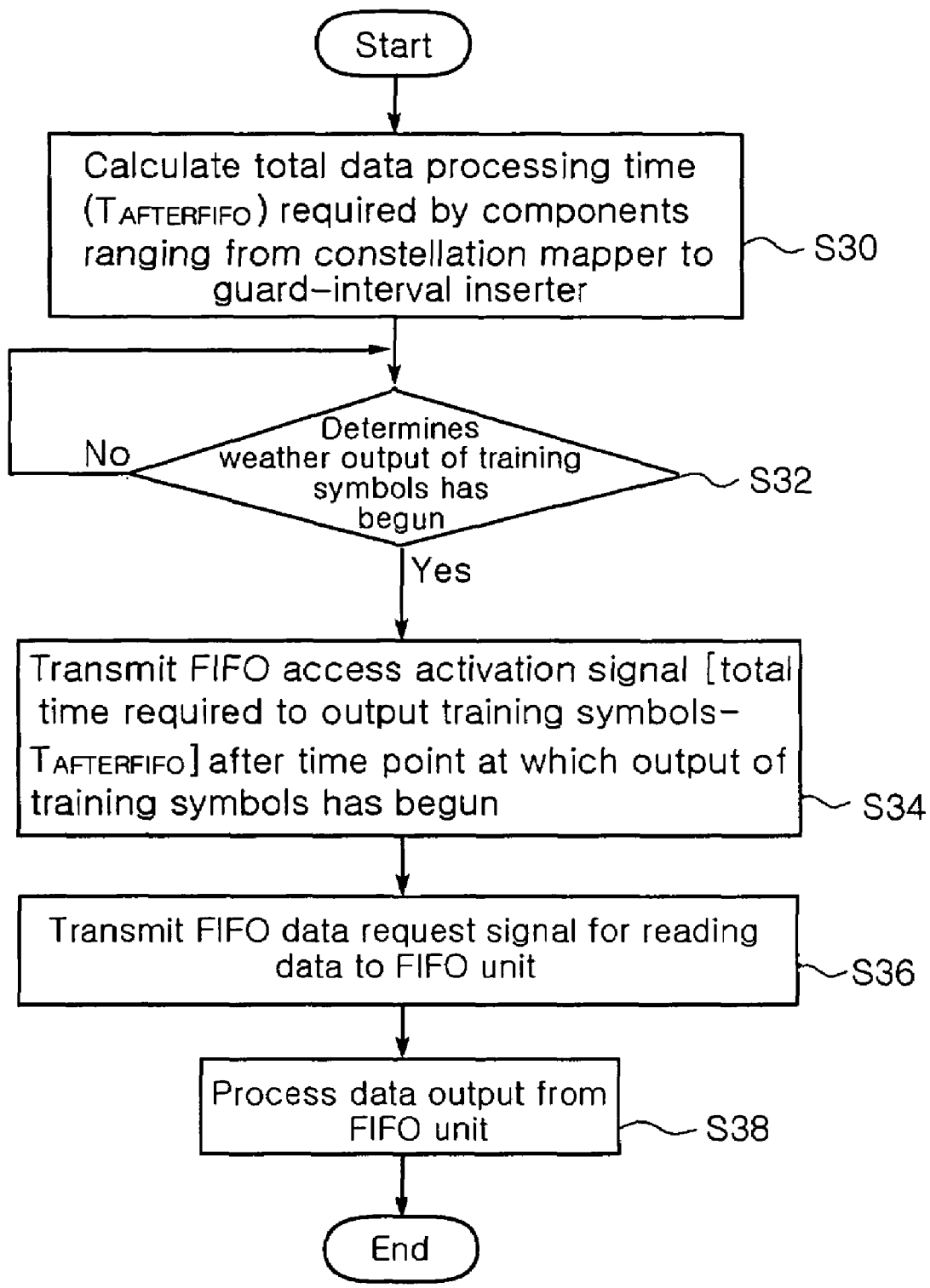
FIG. 15 is a flowchart illustrating an OFDM transmission method for a FIFO operation according to an embodiment of the present invention.

FIG. 15 is a flowchart illustrating an OFDM transmission method for a FIFO operation according to an embodiment of the present invention. The flowchart shown in FIG. 15 can be preferably implemented in the above-described OFDM transmission apparatus. The FIFO operation according to the present invention is described with reference to the above drawings and FIG. 15 below.

As described above, the OFDM transmission apparatus 100, including the scrambler 101, the convolution encoder 102, the interleaver 103, the constellation mapper 104, the inverse fast Fourier transformer 105, the guard-interval inserter 106, the symbol wave-shaping filter 107, the RF converter 108, the delay unit 110, the controller 130 and the training symbol storage and generation unit 150, exchanges data and signals with a MAC layer, that is, an upper layer, and receives a transmission frame 200 from the MAC layer and transmits the transmission frame 200 to the next stage. The transmission frame 200 is composed of a preamble, a signal field and a data field. Referring to FIG. 15, the controller 130 calculates the total data processing time ($T_{AFTERFIFO}$) of the constellation mapper 104, the inverse fast Fourier transformer 105 and the guard-interval inserter 106 that correspond to the components located behind the FIFO unit 140 at step S30. If a frame transmission request signal is received and the output of training symbols begins in response to the training symbol output request signal at step S32, the controller 130 transmits a FIFO access activation signal to the constellation mapper 104 [the total time required to output training symbols−$T_{AFTERFIFO}$] after the time point at which the training symbols are output at step S34. The constellation mapper 104 transmits a FIFO data request signal for reading data to the FIFO unit 140 when the FIFO access activation signal is received at step S36, and then processes data output from the FIFO unit at step S38.

Figure 4:
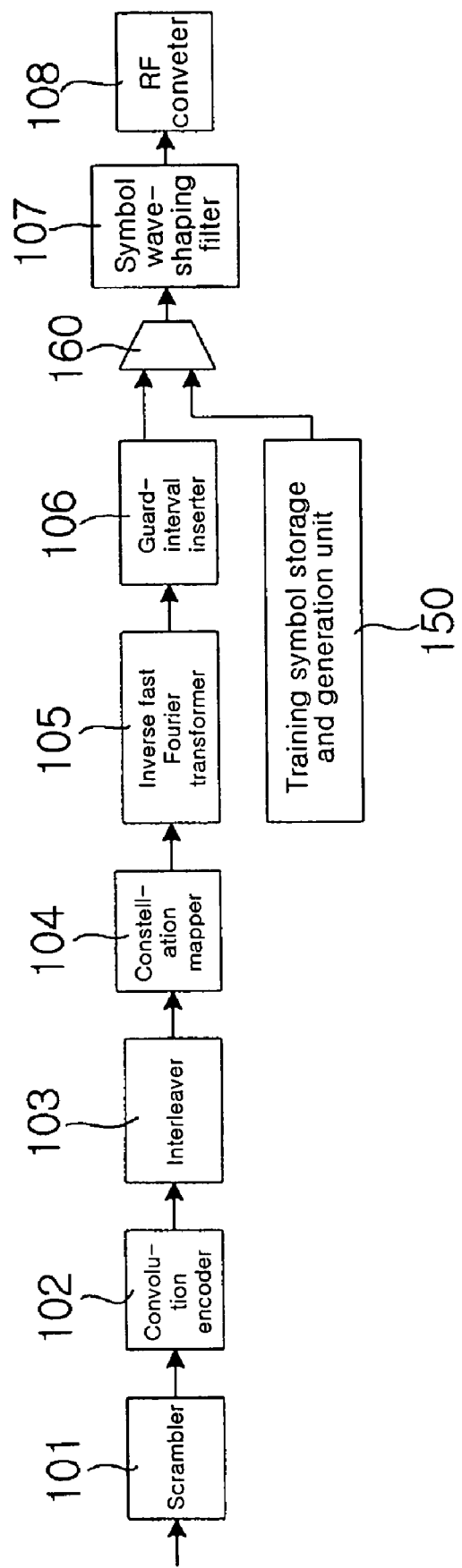
FIG. 4 is a block diagram illustrating the typical construction of an OFDM transmitter having minimal transmission delay based on the IEEE 802.11 standard.

Meanwhile, the conventional transmitter shown in FIG. 4 uses the same clock for all the function blocks. In order to secure a maximum 54-Mbps data rate, a clock close to 80 MHz must be used. If a high-speed clock is used, a heavy load is exerted on the hardware implementation of the inverse fast Fourier transformer. Furthermore, in the OFDM scheme based on the standard, a transmission bandwidth occupied by the guard interval and the OFDM symbol is 20 MHz, so that a function block for allowing the data interval between data strings, which are output from the guard-interval inserter 106 and the training storage and generation unit 150, to be 0.05 µs (=1/20 MHz), is required.

This problem can be solved by the following methods.

In a first method, the clock used in the transmission apparatus 100 of the present invention uses a multiple of 20 MHz. A 40 MHz clock can be used for a transmission data rate up to 24 Mbps. If the transmission data rate exceeds 24 Mbps and is less than 54 Mbps, an 80 MHz clock is used. The training symbol storage and generation unit 105 outputs the same data twice when the 40 MHz clock is used, and outputs the same data four times when the 80 MHz clock is used. Furthermore, the guard-interval inserter 106 outputs the same data twice when the 40 MHz clock is used, and outputs the same data four times when the 80 MHz clock is used.

In a second method, the FIFO unit 140 is positioned at a proper location to separate the clock used to write data into the FIFO unit 140 from the clock used to read data from the FIFO unit 140. This method does not have a problem implementing the inverse fast Fourier transformer 105 in hardware using a high-speed clock. If $T_{PROCESS}$ approaches 16 μs, it is appropriate to position the FIFO unit 140 in front of the symbol wave-shaping filter 107. Since the clocks can be separated on the basis of the FIFO unit 140, a clock suitable for satisfying a transmission data rate is used for function blocks that correspond to the components located in front of the FIFO unit, and a 20 MHz clock is used for the components ranging from the symbol wave-shaping filter that corresponds the component located behind the FIFO unit. Since at least data corresponding to the guard interval and the OFDM symbol field must be stored, the load is very heavy in terms of hardware. If the FIFO unit 140 is positioned in front of the constellation mapper 104 when $T_{PROCESS}$ does not exceed 16 μs, the load is lightest in terms of hardware. Since clocks can be separated on the basis of the FIFO operation, a clock suitable for satisfying a transmission data rate is used for the function blocks that correspond to the components located in front of the FIFO unit, and a 20 MHz clock is used for the components ranging from the constellation mapper 104 that corresponds the component located behind the FIFO unit. However, as described above, the $T_{PROCESS}$ including the processing time of the FIFO unit 140 must not exceed 16 μs.

In a third method, the first and second methods are appropriately combined together. That is, as shown in FIG. 5, the FIFO unit 140 is positioned in front of the constellation mapper 104, and the clock used to write data into the FIFO unit 140 and the clock used to read data from the FIFO unit 140 are separated from each other. Furthermore, a clock suitable for satisfying a transmission data rate is used for the function blocks that correspond to the components located in front of the FIFO unit, and clock using a multiple of 20 MHz is used for the components ranging from the constellation mapper that corresponds to the component located behind the FIFO unit. If a 40 MHz clock is used, the training symbol storage and generation unit 150 and the guard-interval inserter 106 output the same data twice. This method can reduce the load exerted by $T_{PROCESS}$ compared to the second method, and can reduce the load exerted to the hardware implementation of the inverse fast Fourier transformer compared to the first method. However, as described above, $T_{PROCESS}$ including the processing time of the FIFO unit 140 must not exceed 16 μs.

As described above, according to the present invention, a training symbol storage and generation unit is separated, so that it is possible to implement an OFDM transmission apparatus having minimal transmission delay.

Furthermore, a controller that controls a transmission apparatus using a pipeline scheme is used, so that a systematic, efficient OFDM transmission apparatus can be implemented.

Moreover, an interleaver is implemented to allow the time interval from the time point at which data are input to the time point at which the output of the data is completed to be the same for all constellation mapping scheme, so that the present invention is advantageous in that it can mitigate problems occurring at the time of implementing an OFDM transmission apparatus having minimal transmission delay.

Furthermore, an OFDM transmission apparatus, which is flexible in the use of a clock, can be implemented using a FIFO device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An orthogonal frequency division multiplexing (OFDM) transmission apparatus having minimal transmission delay, the apparatus having a scrambler, a convolution encoder, an interleaver, a constellation mapper, an inverse fast Fourier transformer, a guard-interval inserter, a symbol wave-shaping filter and a Radio Frequency (RF) converter, and transmitting a frame composed of a preamble, a signal field and a data field that are received from a Media Access Control (MAC) layer, that is, an upper layer, comprising:

a training symbol storage and generation unit for storing training symbols for the preamble, and outputting the stored training symbols when a training symbol output request signal is received;

a delay unit for receiving data for the signal field from the MAC layer, delaying the received data by data processing time of the scrambler, and then outputting the delayed data to the convolution encoder; and a controller for outputting the training symbol output request signal, requesting the preamble of the frame, to the training symbol storage and generation unit when a frame transmission request is received from the MAC layer, and outputting a data request signal, requesting the signal field and the data field, to the MAC layer in consideration of total data processing time ($T_{PROCESS}$) required by components ranging from the scrambler to the guard-interval inserter;

wherein the scrambler scrambles the received data for the data field of the transmitted frame, and then transmits the scrambled data to the convolution encoder.

2. The OFDM transmission apparatus according to claim 1, wherein the controller outputs the data request signal requesting the signal field to the MAC layer [total time required to output training symbols–$T_{PROCESS}$] after a time point at which the training symbols are output from the training symbol storage and generation unit.

3. The OFDM transmission apparatus according to claim 1, wherein the controller outputs the data request signal requesting the data field to the MAC layer after a transmission interval that is set at a time point at which the data request signal requesting the signal field is output to the MAC layer.

4. The OFDM transmission apparatus according to claim 1, wherein the controller performs control so that data of the signal field, which is output from the delay unit, can be transmitted to the convolution encoder during a set transmission interval and data of the data field, which is output from the scrambler, can be transmitted to the convolution encoder during the transmission interval when the transmission is completed.

5. The OFDM transmission apparatus according to claim 1, wherein the controller receives information about a data rate and a data length, which is contained in the signal field, from the MAC layer, and repeatedly generates the data request signal requesting the data field at set transmission intervals until the data of the data field corresponding to the data length are received from the MAC layer according to the data length.

6. The OFDM transmission apparatus according to claim 5, wherein a length of the data request signal requesting the data field is set according to the data rate.

7. The OFDM transmission apparatus according to claim 1, further comprising a First-In First-Out (FIFO) unit that is provided with dual-port Random Access Memory (RAM) for storing the data, that is placed in front of the constellation mapper, and that differently processes a clock used to write the data into the dual-port RAM and a clock used to read the data from the dual-port RAM.

8. The OFDM transmission apparatus according to claim 7, wherein:

the delay unit, the scrambler, the convolution encoder, the interleaver and the controller, which correspond to components located in front of the FIFO unit, use a clock identical to a clock that is used when data are written into the FIFO unit; and the constellation mapper, the inverse fast Fourier transformer, the guard-interval inserter, the training symbol storage and generation unit and the symbol wave-shaping filter, which correspond to components located behind the FIFO unit, use a clock identical to a clock that is used when data are read from the FIFO unit.

9. The OFDM transmission apparatus according to claim 7, wherein the controller transmits a FIFO access activation signal to the constellation mapper [total output time required to output training symbols–$T_{AFTERFIFO}$] after a time point at which the training symbols are output from the training symbol storage and generation unit when the total data processing time of the constellation mapper, the inverse fast Fourier transformer and the guard-interval inserter, which correspond to the components behind the FIFO unit, is assumed to be $T_{AFTERFIFO}$.

10. The OFDM transmission apparatus according to claim 9, wherein the constellation mapper transmits the data output request signal, which enables the data stored in the FIFO unit to be output, to the FIFO unit when the FIFO access activation signal is received.

11. An OFDM transmission method having minimal transmission delay in an OFDM transmission apparatus, the OFDM transmission apparatus having a scrambler, a convolution encoder, an interleaver, a constellation mapper, an inverse fast Fourier transformer, a guard-interval inserter, a symbol wave-shaping filter and an RF converter, and transmitting a frame composed of a preamble, a signal field and a data field that are received from a MAC layer, that is, an upper layer, comprising:

the first step of calculating total data processing time ($T_{PROCESS}$) required by components ranging from the scrambler to the guard-interval inserter and storing training symbols of a preamble of a frame to be transmitted;

the second step of outputting the stored training symbols when a frame transmission request signal is received from the MAC layer;

the third step of outputting a data request signal requesting a signal field of the frame to the MAC layer [total time required to output training symbols–$T_{PROCESS}$] after a time point at which the training symbols are output;

the fourth step of delaying the data for the signal field, which is received from the MAC layer, by the processing time of the scrambler, and then outputting data for the signal field to the convolution encoder; and the fifth step of outputting the data request signal requesting the data field of the frame to the MAC layer after a transmission interval that is set based on a time point at which the data request signal requesting the signal field is output, and allowing the scrambler to scramble the received data and then output the scrambled data to the convolution encoder when the data for the data field are received from the MAC layer.

12. The OFDM transmission method according to claim 11, wherein output of the data in the fourth and fifth steps is activated during a set transmission interval.

13. The OFDM transmission method according to claim 11, further comprising:

the sixth step of calculating total data processing time ($T_{AFTERFIFO}$) required by components ranging from the constellation mapper to the guard-interval inserter that correspond to components located behind the FIFO unit;

the seventh step of transmitting a FIFO access activation signal to the constellation mapper [total time required to output training symbols–$T_{AFTERFIFO}$] after a time point at which the training symbols are output; and the eighth step of transmitting a data request signal for reading data to the FIFO unit so that the FIFO unit outputs the data when the control signal is generated.

* * * * *